US012587841B2

(12) United States Patent
Elshafie et al.

(10) Patent No.: US 12,587,841 B2
(45) Date of Patent: Mar. 24, 2026

(54) METHODS AND SYSTEMS FOR SECURING DOWNLINK CONTROL INFORMATION WITH SECRET KEYS

(71) Applicant: QUALCOMM Incorporated, San Diego, CA (US)

(72) Inventors: Ahmed Elshafie, San Diego, CA (US); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/554,902

(22) PCT Filed: Jul. 7, 2022

(86) PCT No.: PCT/US2022/036426
§ 371 (c)(1),
(2) Date: Oct. 11, 2023

(87) PCT Pub. No.: WO2023/278900
PCT Pub. Date: Jan. 5, 2023

(65) Prior Publication Data
US 2024/0187850 A1 Jun. 6, 2024

(30) Foreign Application Priority Data
Jul. 1, 2021 (GR) .............................. 20210100452

(51) Int. Cl.
*H04W 12/04* (2021.01)
*H04W 12/037* (2021.01)
(Continued)

(52) U.S. Cl.
CPC ..... *H04W 12/0431* (2021.01); *H04W 12/037* (2021.01); *H04W 12/041* (2021.01);
(Continued)

(58) Field of Classification Search
CPC ........... H04W 12/0431; H04W 12/037; H04W 12/041; H04W 72/0457; H04W 72/231;
(Continued)

(56) References Cited

U.S. PATENT DOCUMENTS

2019/0363843 A1 11/2019 Gordaychik
2021/0050985 A1 2/2021 Ang et al.
(Continued)

FOREIGN PATENT DOCUMENTS

EP 3346668 A1 7/2018
WO 2021072741 A1 4/2021

OTHER PUBLICATIONS

International Search Report and Written Opinion—PCT/US2022/036426—ISA/EPO—Oct. 10, 2022.
(Continued)

*Primary Examiner* — Curtis B Odom
(74) *Attorney, Agent, or Firm* — Paul M. McAdams; Harrity & Harrity, LLP

(57) ABSTRACT

Some aspects of the present disclosure disclose methods and systems directed to securing downlink control information (DCI) using secret keys available to both a user equipment (UE) and a base station (BS). In some aspects, the base station may secure a DCI using one or more secret keys. The secret keys may be generated by the BS and the UE based on an estimation of a radio channel connecting the UE to the BS, and/or the secret keys may be generated at the BS using upper layer encryption techniques and shared with the UE. Upon receiving the DCI, the UE can extract the contents of the secured DCI using the secret keys.

30 Claims, 7 Drawing Sheets

(51) Int. Cl.

| | |
|---|---|
| *H04W 12/041* | (2021.01) |
| *H04W 12/0431* | (2021.01) |
| *H04W 72/02* | (2009.01) |
| *H04W 72/0446* | (2023.01) |
| *H04W 72/0453* | (2023.01) |
| *H04W 72/0457* | (2023.01) |
| *H04W 72/231* | (2023.01) |

(52) U.S. Cl.
CPC ....... *H04W 72/02* (2013.01); *H04W 72/0446* (2013.01); *H04W 72/0453* (2013.01); *H04W 72/0457* (2023.01); *H04W 72/231* (2023.01)

(58) Field of Classification Search
CPC ............. H04W 72/02; H04W 72/0446; H04W 72/0453
See application file for complete search history.

(56) References Cited

U.S. PATENT DOCUMENTS

| | | |
|---|---|---|
| 2021/0195563 A1 | 6/2021 | Lee et al. |
| 2022/0399950 A1* | 12/2022 | Laddu ...................... H04K 1/00 |

OTHER PUBLICATIONS

Qualcomm Incorporated: "Open Issues on BWP", 3GPP TSG RAN WG1 #91, R1-1720693, 3rd Generation Partnership Project, Mobile Competence Centre, 650, Route Des Lucioles, F-06921 Sophia-Antipolis Cedex, France, vol. RAN WG1, No. Reno, NV, USA, Nov. 27, 2017-Dec. 1, 2017, Nov. 18, 2017, 15 Pages, XP051370154, Chapter 2.2.5, the whole document.

* cited by examiner

600

Receive, from a base station (BS), a downlink control information (DCI) configured to be secured with one or more secret keys

610

Generate the one or more secret keys

620

Assign a value for a field in the DCI using the one or more secret keys

630

Communicate with the BS based on the value of the field in the DCI

620

700

Generate one or more secret keys

710

Secure a downlink control information (DCI) using the one or more secret keys, the securing the DCI including encrypting a value of a field in the DCI using a first secret key of the one or more secret keys

720

Transmit the secured DCI to a user equipment (UE) to facilitate communication between the UE and the BS

730

METHODS AND SYSTEMS FOR SECURING DOWNLINK CONTROL INFORMATION WITH SECRET KEYS

CROSS-REFERENCE TO RELATED APPLICATIONS

The present application is a 35 U.S.C. 371 National Phase entry of Patent Cooperation Treaty (PCT) Application No. PCT/US2022/036426, filed Jul. 7, 2022, which claims priority and the benefit of Greek Patent Application No. 20210100452, filed Jul. 1, 2021, the disclosures of which are incorporated herein in their entirety entireties as if fully set forth below and for all applicable purposes.

FIELD OF TECHNOLOGY

The following relates generally to wireless communications and more specifically to securing downlink control information using secret keys available to both a user equipment and a base station.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method of wireless communication performed by a user equipment (UE). The method comprises receiving, from a base station (BS), a downlink control information (DCI) configured to be secured with one or more secret keys; generating the one or more secret keys; assigning a value for a field in the DCI using the one or more secret keys; and communicating with the BS based on the value of the field in the DCI.

Some aspects of the present disclosure disclose a method of wireless communication performed by base station (BS). The method comprises generating one or more secret keys; securing a downlink control information (DCI) using the one or more secret keys, the securing the DCI including encrypting a value of a field in the DCI using a first secret key of the one or more secret keys; and transmitting the secured DCI to a user equipment (UE) to facilitate communication between the UE and the BS.

Some aspects of the present disclosure disclose a user equipment (UE) comprising a memory; at least one processor operatively coupled to the memory; and a transceiver operatively coupled to the at least one processor. In some aspects, the transceiver is configured to receive, from a base station (BS), a downlink control information (DCI) configured to be secured with one or more secret keys. Further, the at least one processor is configured to: generate the one or more secret keys; and determine a value for a field in the DCI using the one or more secret keys. In some aspects, the transceiver is further configured to communicate with the BS based on the value of the field in the DCI.

Some aspects of the present disclosure disclose a base station (BS) comprising a memory; at least one processor operatively coupled to the memory; and a transceiver operatively coupled to the at least one processor. In some aspects, the at least one processor is configured to: generate one or more secret keys; and secure a downlink control information (DCI) using the one or more secret keys, the securing the DCI including encrypting a value of a field in the DCI using a first secret key of the one or more secret keys. Further, the transceiver is configured to: transmit the secured DCI to a user equipment (UE) to facilitate communication between the UE and the BS.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
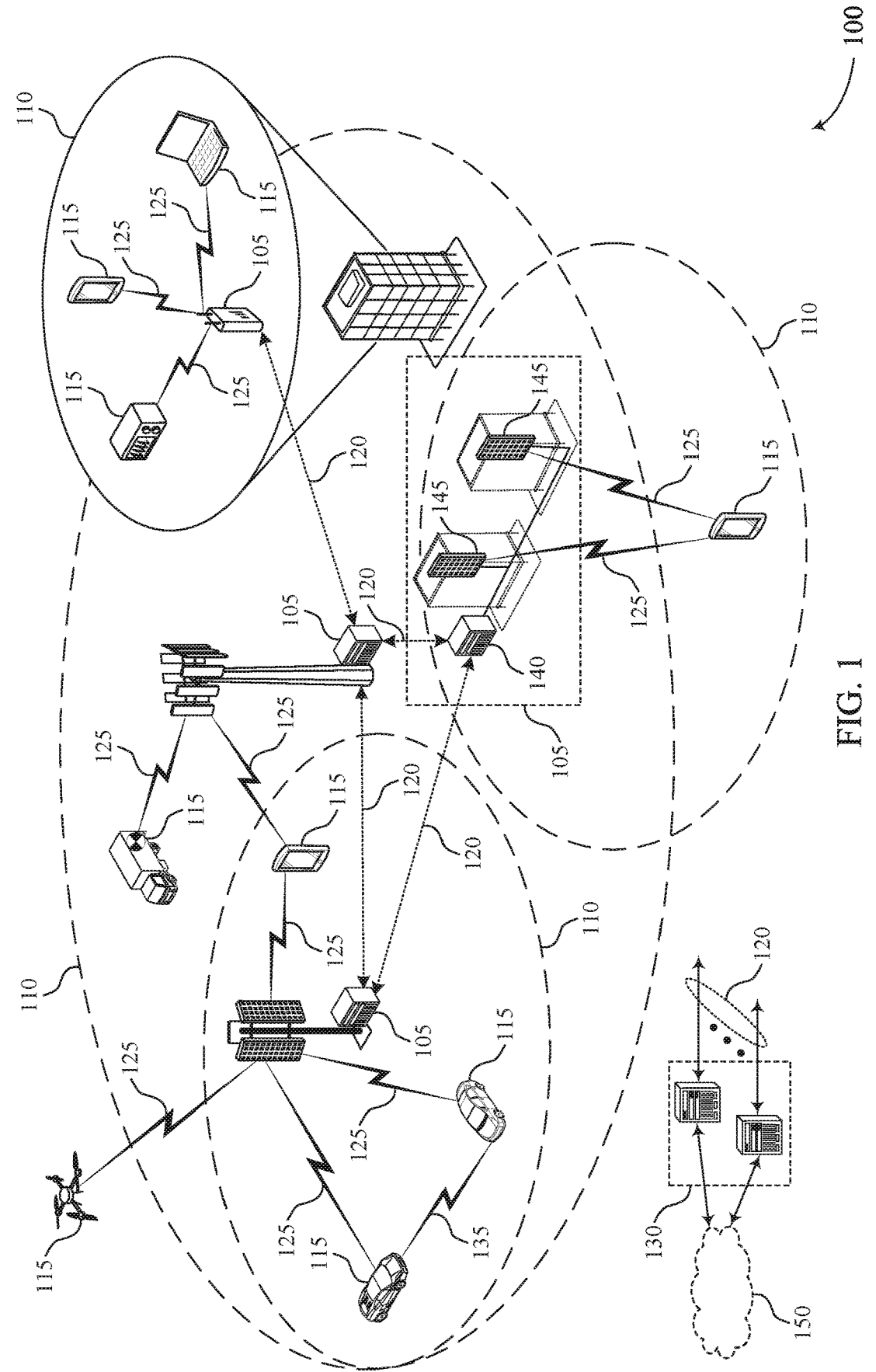
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including time-stringent control with strong security to safeguard sensitive personal, financial, or classified information, ultra-high reliability (e.g., ~99.9999% reliability), ultra-low latency (e.g., ~ 1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHZ FDD/TDD implementations, SCS may occur with 15 kHz, for example over 5, 10, 20 MHZ, and the like bandwidth (BW). For other various outdoor and small cell coverage deployments of TDD greater than 3 GHZ, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHZ, SCS may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Because wireless communications systems such as 5G handle sensitive personal, financial, confidential, etc., information, the security of the systems and communications carried by the systems is an important consideration. This is especially the case for massive IoTs where a large number of devices are connected to each other, which can pose a particular challenge to the security procedures and components employed to maintain the security of the communications systems. As such, additional mechanisms that further safeguard the security of wireless communications can be beneficial. However, because IoTs in general tend to be low-energy/low-power devices, it is desirable that the energy/power requirement of such mechanisms is low. Aspects of the present disclosure provide physical (PHY) layer solutions to these and related scenarios associated with securing wireless communications. In some aspects, downlink control information (DCI) communicated between a BS and a UE is secured using secret keys that are generated by both a UE and a BS based on the channel connecting the UE to the BS, or a symmetric key generated and shared by the BS and the UE (e.g., using a secure key exchange mechanism such as Diffie-Hellman key exchange mechanism), frustrating attempts by eavesdroppers or attackers to track the frequency or time locations of data communications (e.g., physical downlink shared channel (PDSCH) transmissions) between the BS and the UE. For instance, the secret keys can be generated by estimating the channel using sounding signals, and the symmetric key may be generated by the BS and the UE using upper layer encryption schemes. Because of channel randomness, the secret keys can change quickly, which further enhances the security of the DCI, and as such the security of PDSCH transmissions.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example wireless communication network 100 according to some aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., time-stringent) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some instances, a UE 115 may be configured with up to four BWPs in uplink and downlink, but only a single BWP of the four BWPs can be active at a given time, and the UE 115 are not expected to receive or transmit outside the active BWP. In some instances, a single BWP for a carrier may be active at a given time and communications for the UE 115 may be restricted to one or more active BWPs.

In some aspects, the network 100 may operate over a system BW or a component carrier (CC) BW. The network 100 may partition the system BW into multiple BWPs (e.g., portions). A BWP is a contiguous set of physical resource blocks that has the same SCS and as such numerology. A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Additionally, it is noted here that the subcarrier spacing (SCS) has an effect on the number of symbols, such as OFDM symbols, within a subframe. In particular, as SCS spacing gets wider or greater, the slot length will become shorter. For example, a scheduling cell (e.g., base station or gNB) can have an SCS of 15 kHz (i.e., spacing parameter $\mu=0$ in known spacing numerology where the SCS or frequency spacing $\Delta f$ is determined by the equation $\Delta f=2^\mu \times 15$ kHz), which is typically the shortest used SCS spacing, and the scheduled cells (e.g., UEs) can utilize an SCS of 120 kHz (i.e., spacing parameter $\mu=3$ in known spacing numerology) for purposes of this example, but those skilled in the art will appreciate the present disclosure is applicable to any of a number of SCS spacings. In known systems, the 15 kHz SCS would result in a one (1) millisecond (ms) slot, which could also constitute an entire 1 ms subframe. The 120 kHz SCS would result in 8 slots having a duration of ⅛ or 0.125 ms in the 1 ms subframe. These slots can represent eight PDSCH transmissions in a scheduled cell that are scheduled by the PDCCH in the scheduling cell. Of further note, in this example the single slot of the scheduling cell overlaps in time with the eight slots of the scheduled cell when 15 kHz SCS and 120 KHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., $\mu=2$) in the scheduled cell.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (cMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or time-stringent communications. The UEs 115 may be designed to support ultra-reliable, low-latency, or critical functions (e.g., time-stringent functions). Ultra-reliable communications may include secret communication or group communication and may be supported by one or more time-stringent services such as time-stringent push-to-talk (PTT), video, or data. Support for time-stringent functions may include prioritization of services, and time-stringent services may be used for public safety or general commercial applications. The terms ultra-reliable, low-latency, time-stringent, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHZ), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may select values for scheduling or slot offset parameters in a radio frame structure representing resources (e.g., time-frequency resources) for signal communications between the UE 115 and the base stations 105, the requested values for the set of parameters based at least in part on system state information of the UE 115 and attributes related to an operational or activity mode of an application executing or operating on the UE 115. The UE 115 may transmit, to a base station 105, the selected values for the set of parameters. The UE 115 may receive, at least in part as response to the selected values for the set of parameters transmitted to the base station 105, the configured values for the set of slot offset parameters for the UE 115. The UE 115 may then communicate with the base station 105 according to the configured parameters.

Figure 2:
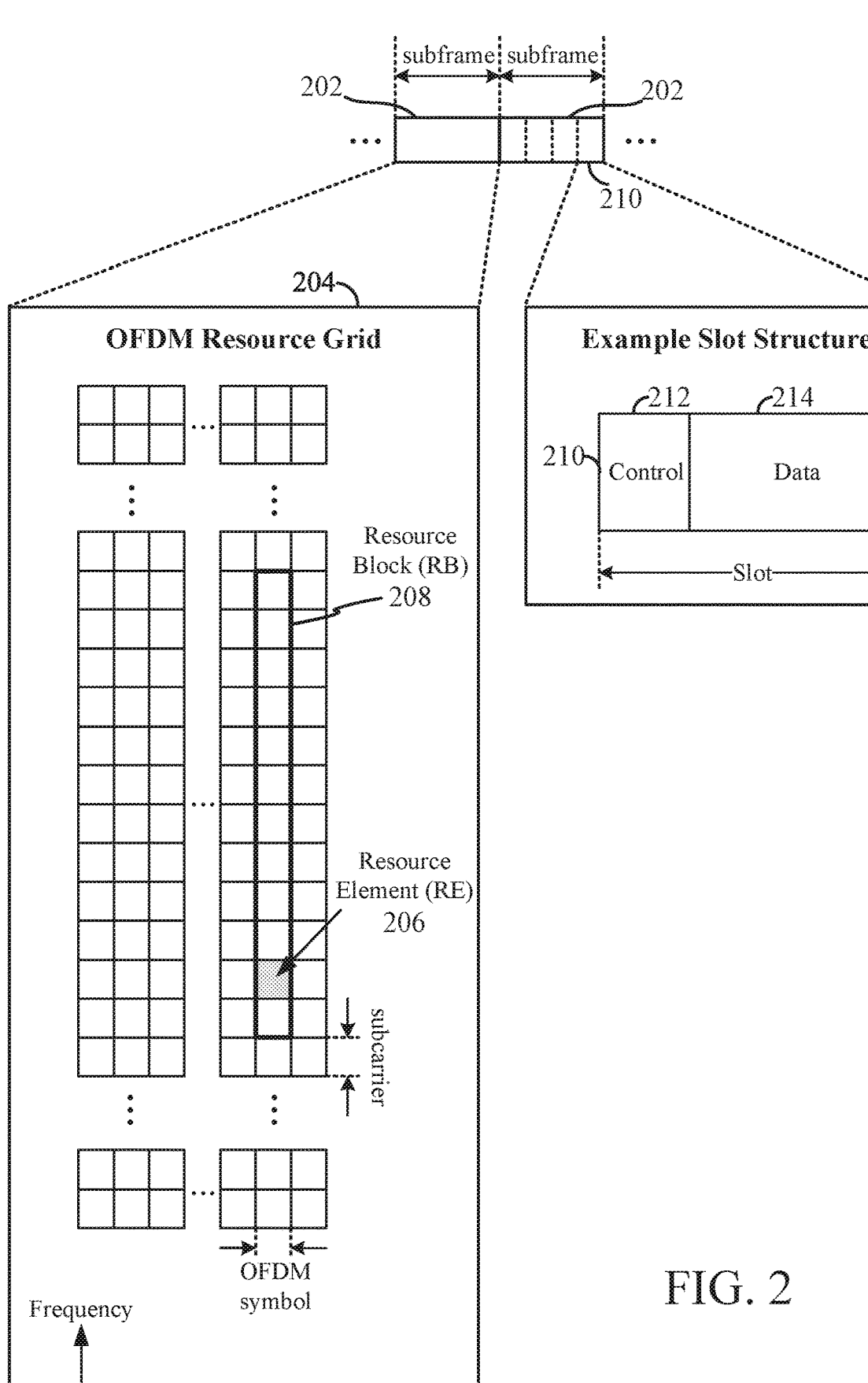
FIG. 2 illustrates an example schematic of an organization of wireless resources in an air interface utilizing orthogonal frequency divisional multiplexing (OFDM), according to some aspects of the present disclosure.

FIG. 2 illustrates an example schematic of an organization of wireless resources in an air interface utilizing orthogonal frequency divisional multiplexing (OFDM), according to some aspects of the present disclosure. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms. In FIG. 2, an expanded view of an exemplary subframe 202 is illustrated, showing an OFDM resource grid. However, as those skilled in the art can readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The radio frame structure or resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, in some aspects, it can be assumed that a single RB such as the RB 208 entirely corresponds to a single direction of communication (either transmission or reception for a given device). A contiguous set of PRBs having the same subcarrier spacing form a BWP.

Scheduling of UEs or sidelink devices (hereinafter collectively referred to as UEs) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

According to some examples, a frame may refer to a duration of 10 ms, with each frame sub-divided into 10 subframes 202 of 1 ms each. Each 1 ms subframe may consist of one or multiple adjacent slots. In the example shown in FIG. 2, subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 210 illustrates the slot as including a control region 212 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 214 of the slot 210 may include a physical sidelink shared channel (PSSCH) including the data transmitted by the initiating (transmitting) sidelink device within resources reserved over the sidelink carrier by the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above are not necessarily all the channels or carriers that may be utilized between a scheduling entity 108 and scheduled entities (e.g., one of more UE 106), and those of ordinary skill in the art may recognize that other channels or carriers may be utilized in addition to those illustrated, such as other traffic, control, and feedback channels.

Figure 3:
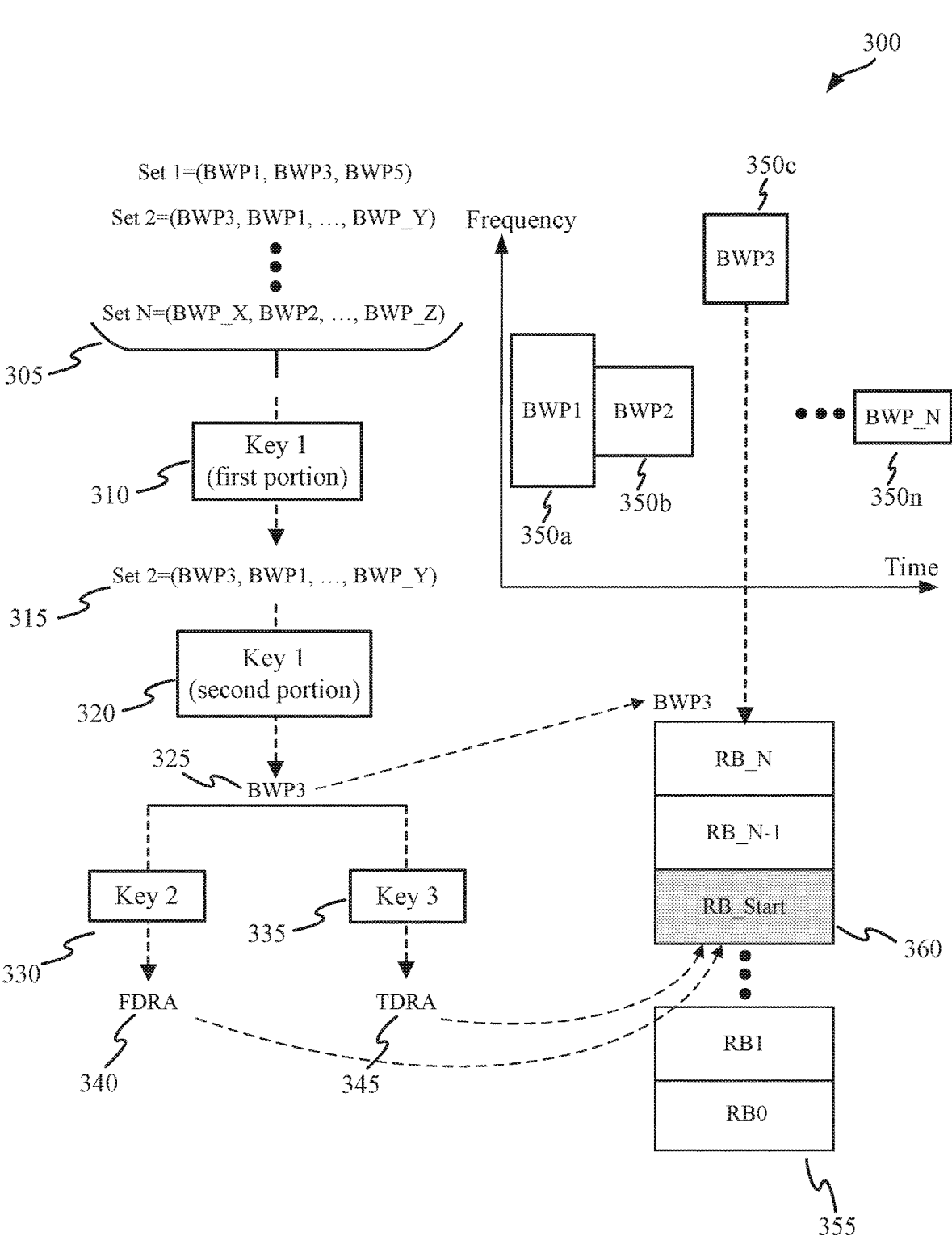
FIG. 3 shows an example illustration of the securing of a downlink control information (DCI) using secret keys available to both a user equipment and a base station, according to some aspects of the present disclosure.

FIG. 3 shows an example illustration of the securing of a downlink control information (DCI) using secret keys available to both a user equipment (UE) and a base station (BS), according to some aspects of the present disclosure. In some aspects, a BS may generate a DCI that may include information about time/frequency locations of PDSCH transmissions to the UE. As such, securing the DCI may secure the PDSCH transmissions from attackers or eavesdroppers. In some instances, the BS may use a set of secret keys Key 1, Key 2, . . . , key K that are available at both the UE and the BS (e.g., keys the UE and BS have agreed on) to secure the DCI before transmitting the same to the UE, and the UE may then use the set of keys to decrypt the secured DCI or otherwise extract the information contained within the secured DCI. In some instances, the secret keys may be generated by both the UE and the BS based on the channel connecting the UE to the BS and/or based on upper layer security schemes (e.g., public key cryptography schemes such as but not limited to Diffie-Hellman scheme, Rivest-Shamir-Adleman (RSA) encryption schemes, elliptic curve cryptography (ECC) encryption schemes, etc.) and share the same with the UE.

In some aspects, the UE and the BS may each generate the set of secret keys using physical layer (PHY)-based secret key generation schemes that exploit the randomness and reciprocity of the radio channel between the UE and the BS. In some instances, the UE and the BS may generate the set of secret keys by each estimating the radio channel, quantizing the radio channel measurements to generate key bits, and performing error corrections to account for differences between the bits each of the UE and the BS obtains after the quantization step, so as to generate the set of secret keys that are common to both the UE and the BS.

In some aspects, the UE and the BS may estimate the radio channel using the radio resources of the channel, examples of which include but are not limited to resource elements (REs), resource blocks (RBs), component carriers (CCs), combinations thereof, etc. In some cases, to obtain K different secret keys, the UE and the BS may estimate the radio channel using K different radio resources, i.e., K different REs, RBs, CCs, combinations thereof, etc. In some aspects, the UE and the BS may exploit channel reciprocity to estimate the radio channel, i.e., the UE and the BS may estimate the radio channel using the same K radio resources.

That is, the UE may estimate the radio channel using the same K different radio resources as those used by the BS to estimate the radio channel.

For example, the UE may be configured with the K different radio resources via a radio resource control (RRC) message or a medium access control-control element (MAC-CE) from the BS. In such cases, the UE may estimate the radio channel using these K different radio resources to generate a set of K secret keys. Further, the BS may also use the same K different radio resources to generate the set of K secret keys. For instance, a RCC bitmap may indicate to the UE which REs of the radio channel the UE may use to estimate the radio channel to generate the set of secret keys. In such a case, both the UE and the BS may use the indicated REs to generate the set of secret keys.

In some aspects, the UE and the BS may estimate the radio channel by probing the channel using signals transmitted to each other via the resources of the radio channel, as discussed above. For instance, as discussed above, the BS may configure the UE with K different radio resources of the radio channel to estimate the radio channel. To generate one secret key of the set of K secret keys, the UE may transmit radio signals (e.g., sounding reference signal (SRS)) to the BS using one of the K different radio resources, and the BS may also transmit radio signals (e.g., downlink reference signals) to the UE using the same one of the K different radio resources (e.g., the K different radio resources may be used similarly to generate the set of K secret keys). In such cases, both the BS and the UE may measure the power, phase, etc., of the respective received radio signal (RSS).

In some aspects, the UE and the BS may then each quantize their respective RSS measurements into L levels. In some instances, the RSS measurements are grouped into L levels, each level corresponding to a secret key sequence having $\log_2(L)$ bits. For example, the RSS measurements may be grouped or bucketed into four levels, in which case RSS measurements in the first level may correspond to bit 00 (i.e., $\log_2(4)=2$ bits), in the second level may correspond to bit 01, in the third level may correspond to bit 10, and in the fourth level may correspond to bit 11. It is to be contemplated that this is a non-limiting example and other quantization schemes may be used to quantize the respective RSS measurements of the BS and the UE.

In some instances, upon quantization of the RSS measurements, there may be discrepancies between the secret key sequences generated by the UE and the BS, for example, due to noise, interference, hardware variations, half-duplex probing signal transmission, etc. In some instances, the UE and the BS may apply key reconciliation techniques to reconcile the discrepancies so that the secret key generated by the UE and the BS is same or at least substantially similar. As such, by estimating the radio channel using a radio resource, quantizing the measurements to generate secret key sequences, and reconciling the secret key sequences between the UE and the BS, the UE and the BS generate a common secret key (e.g., that is shared between the UE and the BS, and available to only the UE and the BS). In some instances, the same or substantially similar procedure may be repeated with the rest of the radio resource of the K different radio resources to generate the set of K secret keys. In some aspects, the K different radio resources may be selected such that the set of K secret keys generated based on the K different radio resources are at least substantially independent from each other.

In some aspects, the set of K secret keys may be generated by both the BS and the UE using upper layer security schemes such as but not limited to a RSA scheme, a ECC scheme, etc. That is the secret keys may be shared between the BS and the UE. For example, one or more secret keys of the set of K secret keys can be symmetric keys that are generated based on the Diffie-Hellman key exchange mechanism, or RSA scheme or technique. For instance, the BS [or the UE] may generate a public key-private key pair and make the public key publicly available, after which the UE [or the BS] may then generate a symmetric key, encrypt the symmetric key with the public key and provide the encrypted symmetric key to the BS [or the UE] (e.g., via a public channel to which other devices may have access). In such cases, the recipient of the encrypted symmetric key (e.g., which is the entity that generated the public key-private key pair) may use the private key to decrypt the encrypted symmetric key (e.g., and the other devices may not be capable of decrypting because those devices lack the private key). In such manner, the BS and the UE may share a set of K secret keys. In some instances, K=1, 2, 3, 4, 5, etc.

In some aspects, as noted above, a BS may secure a DCI with the set of secret keys before transmitting the DCI to the UE, which further enhances the security of the transmission (e.g., PDSCH) that is scheduled by the DCI (e.g., because the time/frequency locations of the transmission that are indicated in the DCI are hidden from eavesdroppers, attackers, etc., by the use of the secret keys). In some instances, securing the DCI with the set of secret keys may include encrypting the DCI itself with a secret key of the set of secret keys. In some instances, securing the DCI with the set of secret keys may include encrypting a value of a field in the DCI using a secret key of the one or more secret keys. For example, the field in the DCI can be the frequency domain resource allocation (FDRA) field or the time domain resource allocation (TDRA) field corresponding to the transmission and the value of the field may be encrypted (e.g., XORed) using one or more of the secret keys. In some instances, securing the DCI with the set of secret keys may include determining and assigning a value of the field using a secret key of the one or more secret keys. For example, the field can be the BWP indication field corresponding to the BWP for the transmission and the value for the BWP indication field, i.e., the BWP indicator, may be determined based on a secret key of the one or more secret keys. FIG. 3 shows an example illustration 300 where three secret keys Key 1, Key 2, and Key 3 are used to secure the BWP indictor field, the FRDA field, and the TDRA field of the DCI. It is to be noted that FIG. 3 is a non-limiting example and that any number of secret keys can be used to secure any of the fields in a DCI.

In wireless communication systems that operate in accordance to Releases 15 and 16 of the 3GPP, a UE may be configured with up to four BWPs, where a single one of them may be active at a time in the DCI. In some aspects of the present disclosure, it is contemplated that a UE may be configured with more than four BWPs. Further, the UE may be configured with one or more BWP sets, where a BWP set may include one or more BWPs and the multiple BWP sets may be overlapping or non-overlapping BWP sets. For example, a UE may be configured with the multiple BWP sets 305 (e.g., N number of BWP sets) that include Set 1 having three BWP indicators (e.g., BWP1, BWP3, and BWP5), which overlaps with Set 2 that also includes BWP3. Further, the BWP indicators may be included or listed in a given BWP set in any order (e.g., BWP3 listed before BWP1 in Set 2).

In some aspects, Key 1 may be used to determine, from the one or more BWP sets with which the UE is configured, a value for the BWP indication field of the DCI. In other words, the UE may use Key 1 to determine which one of BWP1, BWP2, . . . , BWPZ, etc., may be selected or assigned as the value for the BWP indication field in the DCI. In some instances, the UE may be configured, by a RRC and/or MAC-CE message from the BS, with one or more methods or modes for selecting the value for the BWP indication field. For example, the one or more modes may be pre-specified (e.g., in a specification of the 3GPP standards). For instance, the first mode may specify that given Y BWP sets that the UE is configured with (e.g., by the RRC and/or MAC-CE message), a first part 310 of Key 1 having $\log_2(Y)$ bits may be used to select the BWP set 315 and a second part 320 of Key 1, the next X bits of Key 1, may be used to select the BWP indicator 325 from the selected BWP set, provided there are $2^X$ BWP indicators in the selected BWP set. As a non-limiting illustrative example, Key 1=010011000 . . . , and there may be four BWP sets that the UE is configured with (e.g., first set corresponding to bit 00, second set corresponding to bit 01, third set corresponding to bit 10, and fourth set corresponding to bit 11). In such cases, the first mode for using Key 1 may specify that the first $\log_2(4)=2$ bits, i.e., 01, of Key 1 may be used to select the BWP set, i.e., the second set. And if the second set includes $2^{X=1}=2$ BWP indicators (e.g., the first BWP indictor corresponding to bit 0 and the second corresponding to bit 1), then the next X=1 bit of Key 1 may be used to select one of the 2 BWP indicators to be assigned as a value for the BWP indicator field in the DCI (e.g., since the next X=1 bit of Key 1 (i.e., the third bit of Key 1) is 0, then the first BWP indictor 325 that corresponds to bit 0 may be selected and assigned as the value for the BWP indicator field in the DCI).

In some aspects, the mode for selecting the value for the BWP indication field may be provided by the RRC and/or MAC-CE message from the BS. For example, the RRC and/or MAC-CE message may include a first bitmap with an indication for the UE to select a BWP set from number of sets as the length of the bitmap. Further, the RRC and/or MAC-CE message may include a second bitmap for use in selecting a BWP indicator of the BWP indicators included in the selected BWP set. In some aspects, upon selecting or assigning a BWP indicator as the value for the BWP indication field in the DCI (e.g., based on any of the modes discussed above), the UE may communicate with the BS using a BWP of the radio channel between the UE and the BS that is indicated by the selected BWP indicator.

In some aspects, Key 2 330 and Key 3 335 may be used to secure the FDRA field and the TDRA field in the DCI that indicate the frequency and time locations in the data channel, respectively, of the transmission (e.g., PDSCH) that is scheduled by the DCI. For example, when generating the DCI, the BS may encrypt (e.g., XOR) the value of the FDRA field, i.e., the frequency allocation information bitmap, using Key 2, and the value of the TDRA field, i.e., the time allocation information, using Key 3. For instance, as a non-limiting illustrative example, if the intended or actual TDRA indication or index is j=3, then the BS may encrypt the index and include in the DCI the encrypted value of the TDRA index. For instance, the BS may compute j=XOR(i, Key 3 (or a part thereof)) and include j in the DCI to signal the UE. In such cases, upon receiving the DCI, the UE may decrypt the encrypted values using the same keys (i.e., Key 2 330 and Key 3 335) that were used by the BS to encrypt the field values to extract the FDRA indication 340 and the TDRA indication 345, because the keys are shared or available to both the UE and the BS. As such, with reference to the above example, the UE may decrypt j by computing XOR (j, Key 3 (or the part thereof))=i.

In some instances, the UE may then communicate with the BS based on the decrypted values of the fields in the DCI. That is, for instance, the UE may communicate with the BS using a resource block of the BWP corresponding to the decrypted FDRA indication/value and/or TDRA indication/value. With reference to FIG. 3, a UE may be configured with the bandwidth parts BWP1 350a, BWP2 350b, BWP3 350c, . . . , BWP_N 350n by the BS (e.g., via a RCC/MAC-CE), and the UE may select BWP3 350c using a first secret of a set of secret keys shared between or available to the UE and the BS. Then, the UE may extract (e.g., decrypt) the FDRA indication and the TDRA indication using other secret keys of the set of secret keys, and use the radio resource (e.g., starting resource block 360) of BWP3 355 of the radio channel to communicate with the BS. As noted above, the above is a non-limiting illustrative example, and any number of secret keys that are shared between the UE and the BS (e.g. or otherwise available to both the UE and the BS) can be used to encrypt or otherwise secure any of the fields in the DCI transmitted by the BS to the UE.

In some instances, since the TDRA index is signaled, the underlying configured elements in the RRC may also be configured by Key 3. In some instances, the RRC configuration may also be secured (e.g., encrypted) using Key 3 or any other secret key of the set of secret keys. For instance, a given TDRA index (e.g., TDRA=0) may be associated with transmission parameters such as but not limited to startsymbolandlength, K0, and mappingtype, and these parameters may also be encrypted (e.g., XORed) in binary domain (e.g., after the parameters are converted to binary values) using Key 3, any other secret key of the set of secret keys, or part thereof. In some aspects, the entire DCI may be encrypted (e.g., XORed) using another secret key (e.g., key 4) of the set of secret keys.

Figure 4:
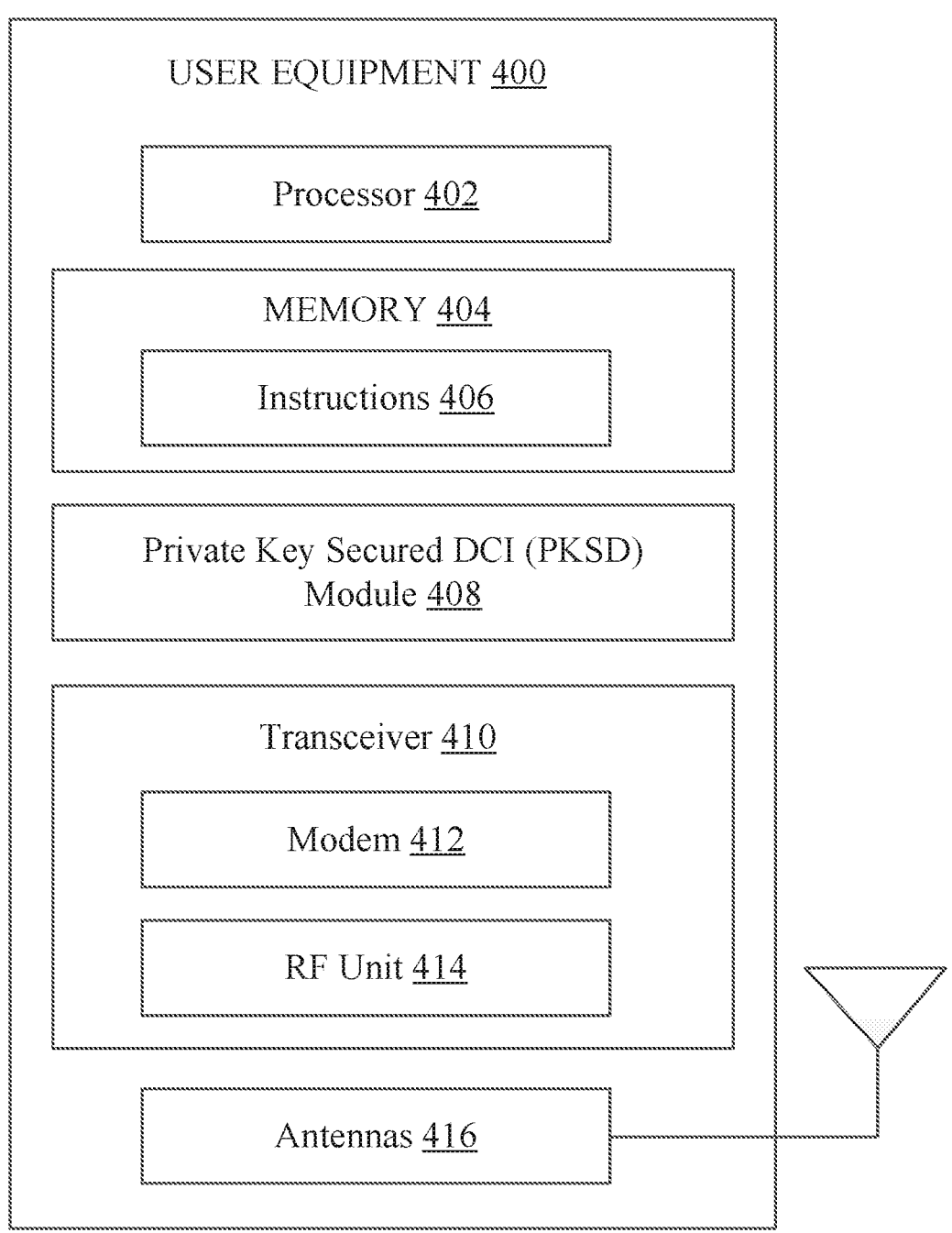
FIG. 4 is a block diagram of an example user equipment (UE) according to some aspects of the present disclosure.

FIG. 4 is a block diagram of an example UE 400 according to some aspects of the present disclosure. The UE 400 may be a UE 115 in the network 100 as discussed above in FIG. 1. As shown, the UE 400 may include a processor 402, a memory 404, a PKSD module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-3, and 6. Instructions 406 may also be referred to as program code. The program code may be for causing a wireless communication device to perform these operations, for example by causing one or more processors (such as processor 402) to control or command the wireless communication device to do so. For example, the processor 402 may be caused or configured to generating one or more secret keys; and determine a value for a field in the DCI using the one or more secret keys. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PKSD module 408 may be implemented via hardware, software, or combinations thereof. For example, the PKSD module 408 may be implemented as a processor, circuit, and/or instructions 406 stored in the memory 404 and executed by the processor 402. In some examples, the PKSD module 408 can be integrated within the modem subsystem 412. For example, the PKSD module 408 can be implemented by a combination of software components (e.g., executed by a DSP or a general processor) and hardware components (e.g., logic gates and circuitry) within the modem subsystem 412. The PKSD module 408 may be used for various aspects of the present disclosure, for example, aspects of FIGS. 1-3, and 6. The PKSD module 408 can be configured to receive, from a base station (BS), a downlink control information (DCI) configured to be secured with one or more secret keys; generate the one or more secret keys; determine a value for a field in the DCI using the one or more secret keys; and communicate with the BS based on the value of the field in the DCI.

As shown, the transceiver 410 may include the modem subsystem 412 and the RF unit 414. The transceiver 410 can be configured to communicate bi-directionally with other devices, such as the UEs 115, and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and/or the RF unit 414 may be separate devices that are coupled together at a UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., PSCCH, PSSCH, PSFCH, measurement data, and/or sensor data records) to the PKSD module 408 for processing. The antennas 416 may include multiple antennas of similar or different designs in order to sustain multiple transmission links.

In some aspects, the transceiver 410 is configured to communicate with the base station to receive from the base station a downlink control information (DCI) configured to be secured with one or more secret keys; and communicate with the BS based on the value of the field in the DCI.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
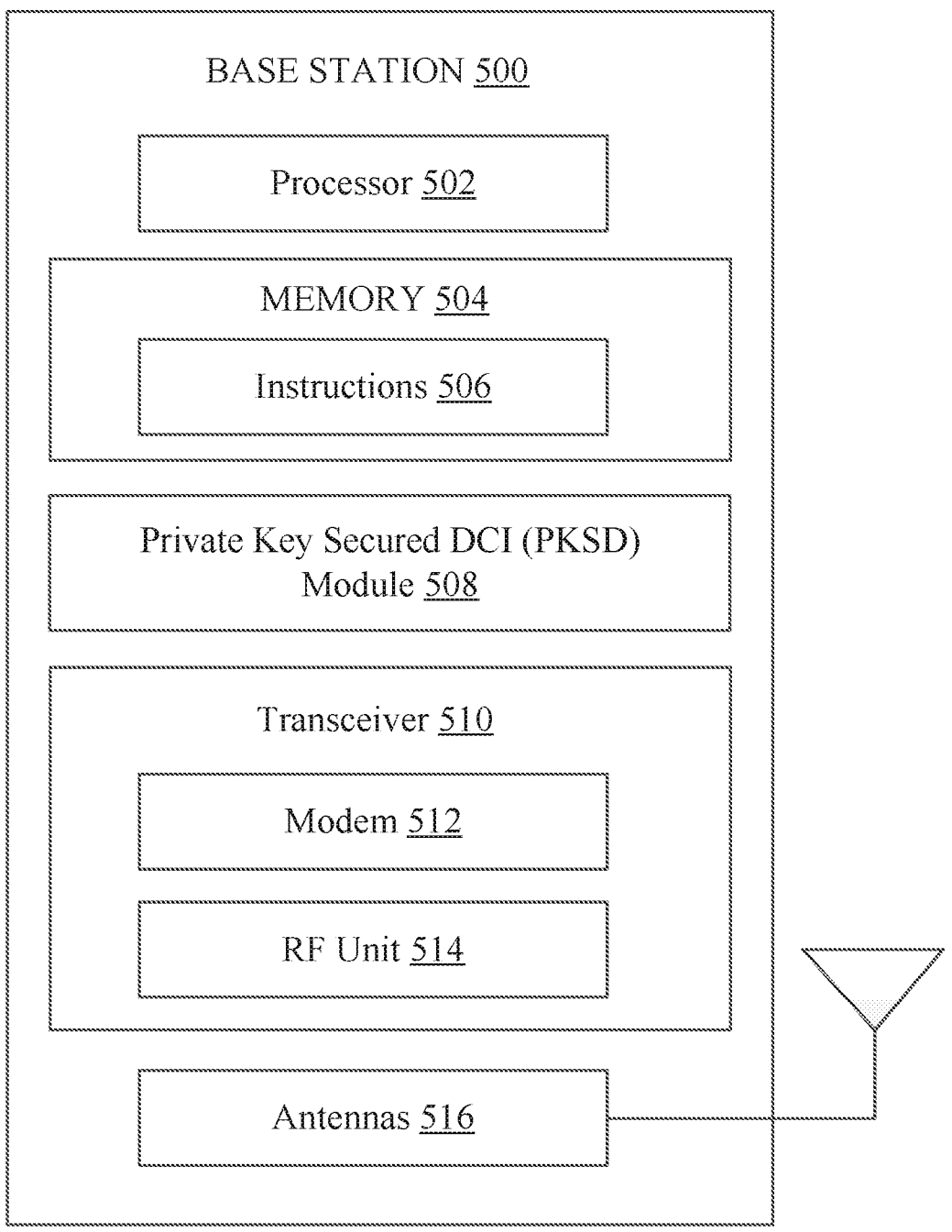
FIG. 5 is a block diagram of an example base station (BS) according to aspects of the present disclosure.

FIG. 5 is a block diagram of an example base station (BS) 500 according to some aspects of the present disclosure. The BS 500 may be a BS 105 discussed above in FIG. 1. As shown, the BS 500 may include a processor 502, a memory 504, a PKSD module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein in connection with aspects of the present disclosure, for example, aspects of FIGS. 1-4, and 7. For example, the processor 502 may be caused or configured to generate one or more secret keys and secure a downlink control information (DCI) using the one or more secret keys, the securing the DCI including encrypting a value of a field in the DCI using a first secret key of the one or more secret keys. Instructions 506 may also be referred to as program code, which may be interpreted broadly to include any type of computer-readable statement(s) as discussed below with respect to FIG. 7.

The PKSD module 508 may be implemented via hardware, software, or combinations thereof. For example, the PKSD module 508 may be implemented as a processor, circuit, and/or instructions 506 stored in the memory 504 and executed by the processor 502. In some examples, the PKSD module 508 can be integrated within the modem subsystem 512. For example, the PKSD module 508 can be implemented by a combination of software components (e.g., executed by a DSP or a general processor) and hardware components (e.g., logic gates and circuitry) within the modem subsystem 512.

The PKSD module 508 may be used for various aspects of the present disclosure, for example, aspects of FIGS. 1-4, and 7. For example, the PKSD module 508 may be configured to generate one or more secret keys; secure a downlink control information (DCI) using the one or more secret keys, the securing the DCI including encrypting a value of a field in the DCI using a first secret key of the one or more secret keys; and transmit the secured DCI to a user equipment (UE) to facilitate communication between the UE and the BS.

As shown, the transceiver 510 may include a modem subsystem 512 and an RF unit 514. The transceiver 510 can be configured to communicate bi-directionally with other devices, such as the BSs 105. The modem subsystem 512 may be configured to modulate and/or encode the data from the memory 504 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUSCH signal, UL data, SRSs, UE capability reports, RI reports) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 500 to enable the BS 500 to communicate with other devices.

The RF unit 514 may provide modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., DCI) to the PKSD module 508. The antennas 516 may include multiple antennas of similar or different designs in order to sustain multiple transmission links. The RF unit 514 may configure the antennas 516.

In some aspects, the transceiver 510 is configured to communicate with the base station to transmit a DCI secured with secret keys to a UE to facilitate communication between the UE and the BS.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
FIG. 6 illustrates a flow diagram of a wireless communication method according to some aspects of the present disclosure.
Figure 6:
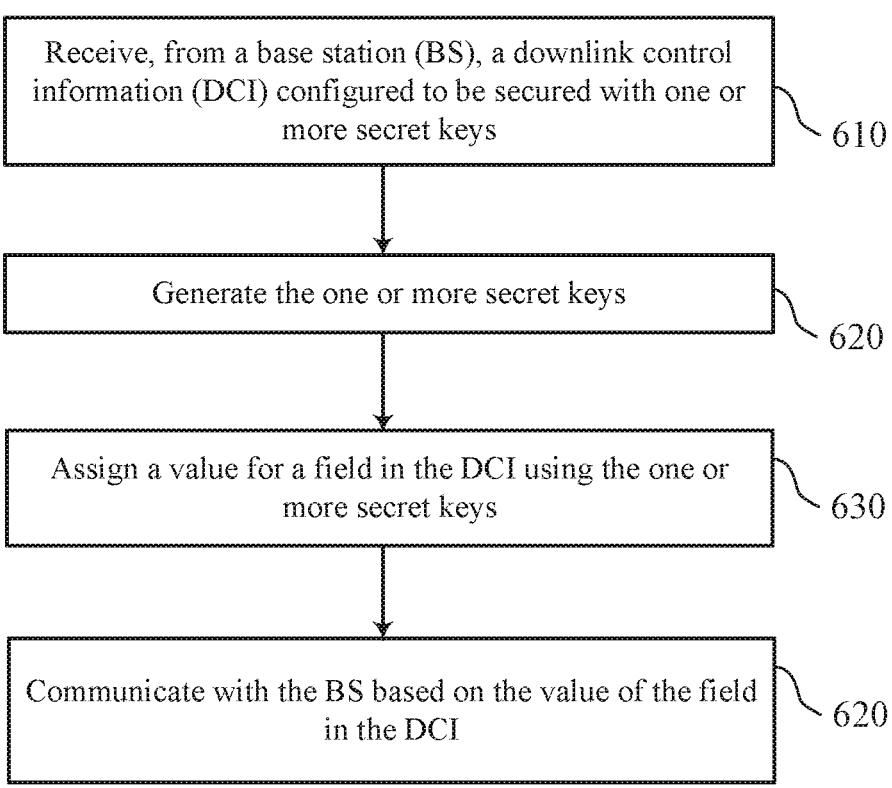

FIG. 6 is a flow diagram of a wireless communication method 600 according to some aspects of the present disclosure. Aspects of the method 600 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 402, the memory 404, the PKSD module 408, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At block 610, a UE (e.g., the UEs 115) can receive, from a base station (BS), a downlink control information (DCI) configured to be secured with one or more secret keys. In some instances, the UE may utilize one or more components, such as the processor 402, the memory 404, the PKSD module 408, the transceiver 410, the modem 412, and the one or more antennas 416, to receive, from a base station (BS), a downlink control information (DCI) configured to be secured with one or more secret keys.

At block 620, the UE can generate the one or more secret keys. In some instances, the UE may utilize one or more components, such as the processor 402, the memory 404, the PKSD module 408, the transceiver 410, the modem 412, and the one or more antennas 416, to generate the one or more secret keys.

At block 630, the UE can determine a value for a field in the DCI using the one or more secret keys. In some instances, the UE may utilize one or more components, such as the processor 402, the memory 404, the PKSD module 408, the transceiver 410, the modem 412, and the one or more antennas 416, to determine a value for a field in the DCI using the one or more secret keys.

At block 630, the UE can communicate with the BS based on the value of the field in the DCI. In some instances, the UE may utilize one or more components, such as the processor 402, the memory 404, the PKSD module 408, the transceiver 410, the modem 412, and the one or more antennas 416, to communicate with the BS based on the value of the field in the DCI.

Some aspects of method 600 may further comprise the UE estimating a radio channel configured to connect the UE to the BS using a radio resource of the radio channel, a secret key of the one or more secret keys generated based on the estimating the radio channel. In some instances, the radio resource is a resource element (RE), a resource block (RB), a component carrier (CC), or a combination thereof, of a radio frame of the radio channel. In some instances, the UE may further receive, from the BS, a radio resource control (RRC) message or a medium access control-control element (MAC-CE) message configuring the UE with the radio resource to be used for the estimating the radio channel. In some aspects, a secret key of the one or more secret keys is a symmetric key shared between the BS and the UE.

Some aspects of method 600 may further comprise the UE receiving, from the BS, a message radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the UE to the BS. In some instances, the UE selects a BWP set from the one or more BWP sets using a first secret key, or a first part thereof, of the one or more secret keys.

Some aspects of method 600 may further comprise the UE selecting a BWP set from the one or more BWP sets using a first secret key, or a first part thereof, of the one or more secret keys. In some aspects, the UE selects a BWP indicator of the one or more BWP indicators of the selected BWP set using the first secret key, or a second part thereof. In some instances, the UE assigns the selected BWP indicator as the value for the field in the DCI. In some instances, the UE communicates with the BS using the BWP of the radio frame of the radio channel identified by the assigned BWP indicator. In some aspects, the UE may decrypt the selected BWP indicator using the first secret key, or a third part thereof, prior to assigning the selected BWP indicator as the value for the field in the DCI.

In some aspects, the field in the DCI is a frequency allocation field, and the value is an encrypted frequency domain resource allocation (FDRA) indication encrypted using a first secret key of the one or more secret keys. In some aspects, the UE may further select, using a second secret key of the one or more secret keys, a BWP of a radio frame of a radio channel configured to connect the UE to the BS; and decrypting, using the first secret key, the encrypted FDRA indication in the DCI. In some instances, the UE may assign the decrypted FDRA indication as the value for the field in the DCI and communicate with the BS using a resource block of the BWP corresponding to the assigned decrypted FDRA indication.

In some aspects, the field in the DCI is a time domain resource allocation (TDRA) field, and the value is an encrypted TDRA indication encrypted using a first secret key of the one or more secret keys. In some aspects, the UE may further select, using a second secret key of the one or more secret keys, a BWP of a radio frame of a radio channel configured to connect the UE to the BS and decrypt, using the first secret key, the encrypted TDRA indication in the DCI. In some instances, the UE may assign the decrypted TDRA indication as the value for the field in the DCI and communicate with the BS using a TDRA configuration of the BWP corresponding to the assigned decrypted TDRA indication. In some instances, the UE may receive, from the BS, a RRC message including an encrypted TDRA configuration; and decrypt, using a third secret key of the one or more secret keys, the encrypted TDRA configuration to generate the TDRA configuration of the BWP used for the communication with the BS.

In some instances, the DCI is configured to be encrypted with a secret key of the one or more secret keys.

Figure 7:
FIG. 7 illustrates a flow diagram of a wireless communication method according to some aspects of the present disclosure.
Figure 7:
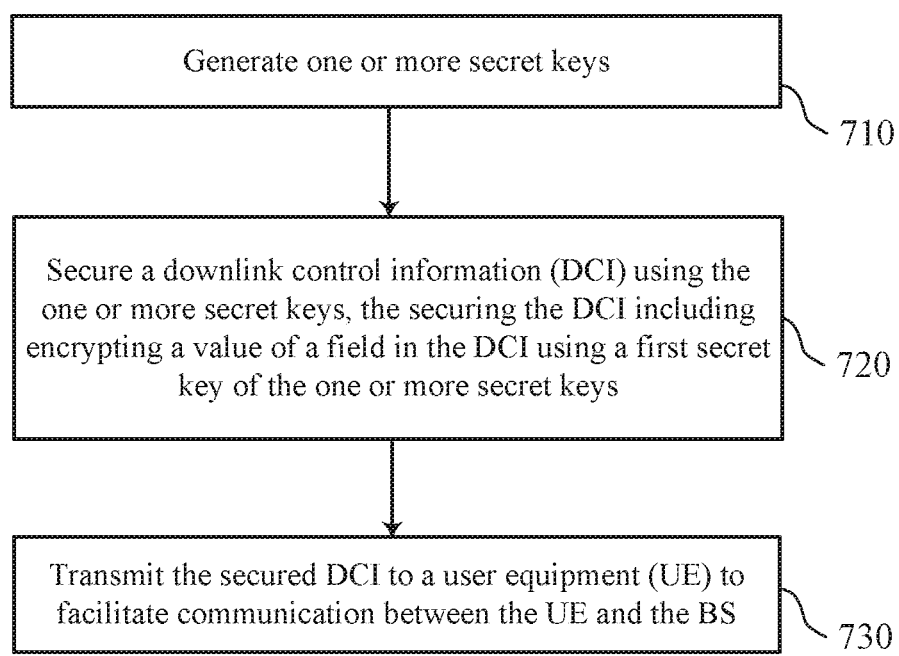

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the BSs 105 may utilize one or more components, such as the processor 502, the memory 504, the PKSD module 508, the transceiver 510, the modem 512, and the one or more antennas 516, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a BS (e.g., the BSs 105) can generate one or more secret keys. In some instances, the BS may utilize one or more components, such as the processor 502, the memory 504, the PKSD module 508, the transceiver 510, the modem 512, and the one or more antennas 516, to generate one or more secret keys.

At block 720, the BS can secure a downlink control information (DCI) using the one or more secret keys, the securing the DCI including encrypting a value of a field in the DCI using a first secret key of the one or more secret keys. In some instances, the BS may utilize one or more components, such as the processor 502, the memory 504, the PKSD module 508, the transceiver 510, the modem 512, and the one or more antennas 516, to secure a downlink control information (DCI) using the one or more secret keys, securing the DCI including encrypting a value of a field in the DCI using a first secret key of the one or more secret keys.

At block 730, the BS can transmit the secured DCI to a user equipment (UE) to facilitate communication between the UE and the BS.

Some aspects of method 700 further comprise estimating a radio channel configured to connect the BS to the UE using a radio resource of the radio channel, a secret key of the one or more secret keys generated based on the estimating the radio channel. In some aspects, the radio resource is a resource element (RE), a resource block (RB), a component carrier (CC), or a combination thereof, of a radio frame of the radio channel. Further, the BS may transmit to the UE a radio resource control (RRC) message or a medium access control-control element (MAC-CE) message to configure the UE with the radio resource to be used for the estimating the radio channel.

In some aspects, a secret key of the one or more secret keys is a symmetric key shared between the BS and the UE. In some aspects, the secured DCI is encrypted with a secret key of the one or more secret keys.

Some aspects of method 700 further comprise transmitting, to the UE, a message radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the BS to the UE.

RECITATIONS OF SOME ASPECTS OF THE PRESENT DISCLOSURE

Aspect 1: A method of wireless communication performed by a user equipment (UE), the method comprising: receiving, from a base station (BS), a downlink control information (DCI) configured to be secured with one or more secret keys; generating the one or more secret keys; assigning a value for a field in the DCI using the one or more secret keys; and communicating with the BS based on the value of the field in the DCI.

Aspect 2: The method of aspect 1, further comprising: estimating a radio channel configured to connect the UE to the BS using a radio resource of the radio channel, a secret key of the one or more secret keys generated based on the estimating the radio channel.

Aspect 3: The method of aspect 2, wherein the radio resource is a resource element (RE), a resource block (RB), a component carrier (CC), or a combination thereof, of a radio frame of the radio channel.

Aspect 4: The method of aspect 2 or 3, further comprising receiving, from the BS, a radio resource control (RRC) message or a medium access control-control element (MAC-CE) message configuring the UE with the radio resource to be used for the estimating the radio channel.

Aspect 5: The method of any of aspects 1-4, wherein a secret key of the one or more secret keys is a symmetric key shared between the BS and the UE.

Aspect 6: The method of any of aspects 1-5, further comprising: receiving, from the BS, a message radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the UE to the BS.

Aspect 7: The method of aspect 6, further comprising selecting a BWP set from the one or more BWP sets using a first secret key, or a first part thereof, of the one or more secret keys.

Aspect 8: The method of aspect 7, further comprising: selecting a BWP indicator of the one or more BWP indicators of the selected BWP set using the first secret key, or a second part thereof, wherein: the assigning includes assigning the selected BWP indicator as the value for the field in the DCI; and the communicating includes communicating with the BS using the BWP of the radio frame of the radio channel identified by the assigned BWP indicator.

Aspect 9: The method of aspect 8, further comprising decrypting the selected BWP indicator using the first secret key, or a third part thereof, prior to assigning the selected BWP indicator as the value for the field in the DCI.

Aspect 10: The method of any of aspects 1-9, wherein: the field is a frequency allocation field, and the value is an encrypted frequency domain resource allocation (FDRA) indication encrypted using a first secret key of the one or more secret keys, the method further comprising: selecting, using a second secret key of the one or more secret keys, a BWP of a radio frame of a radio channel configured to connect the UE to the BS; and decrypting, using the first secret key, the encrypted FDRA indication in the DCI, wherein: the assigning includes assigning the decrypted FDRA indication as the value for the field in the DCI; and the communicating includes communicating with the BS using a resource block of the BWP corresponding to the assigned decrypted FDRA indication.

Aspect 11: The method of any of aspects 1-10, wherein: the field is a time domain resource allocation (TDRA) field, and the value is an encrypted TDRA indication encrypted using a first secret key of the one or more secret keys, the method further comprising: selecting, using a second secret key of the one or more secret keys, a BWP of a radio frame of a radio channel configured to connect the UE to the BS; and decrypting, using the first secret key, the encrypted TDRA indication in the DCI, wherein: the assigning includes assigning the decrypted TDRA indication as the value for the field in the DCI; and the communicating includes communicating with the BS using a TDRA configuration of the BWP corresponding to the assigned decrypted TDRA indication.

Aspect 12: The method of aspect 11, further comprising: receiving, from the BS, a RRC message including an encrypted TDRA configuration; and decrypting, using a third secret key of the one or more secret keys, the encrypted TDRA configuration to generate the TDRA configuration of the BWP used for the communication with the BS.

Aspect 13: The method of any of aspects 1-12, wherein the DCI is configured to be encrypted with a secret key of the one or more secret keys.

Aspect 14: A method of wireless communication performed by a base station (BS), the method comprising: generating one or more secret keys; securing a downlink control information (DCI) using the one or more secret keys, the securing the DCI including encrypting a value of a field in the DCI using a first secret key of the one or more secret keys; and transmitting the secured DCI to a user equipment (UE) to facilitate communication between the UE and the BS.

Aspect 15: The method of aspect 14, further comprising: estimating a radio channel configured to connect the BS to the UE using a radio resource of the radio channel, a secret key of the one or more secret keys generated based on the estimating the radio channel.

Aspect 16: The method of aspect 15, wherein the radio resource is a resource element (RE), a resource block (RB), a component carrier (CC), or a combination thereof, of a radio frame of the radio channel.

Aspect 17: The method of aspect 15 or 16, further comprising: transmitting, to the UE, a radio resource control (RRC) message or a medium access control-control element (MAC-CE) message to configure the UE with the radio resource to be used for the estimating the radio channel.

Aspect 18: The method of any of aspects 14-17, wherein a secret key of the one or more secret keys is a symmetric key shared between the BS and the UE.

Aspect 19: The method of any of aspects 14-17, further comprising: transmitting, to the UE, a message radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the BS to the UE.

Aspect 20: The method of any of aspects 14-17, wherein the secured DCI is encrypted with a secret key of the one or more secret keys.

Aspect 21: A user equipment (UE), comprising: a memory; a processor coupled to the memory; and a transceiver coupled to the processor, the UE configured to perform the methods of aspects 1-13.

Aspect 22: A base station (BS), comprising: a memory; a processor coupled to the memory; and a transceiver coupled to the processor, the BS configured to perform the methods of aspects 14-20.

Aspect 23: A user equipment (UE) comprising means for performing the methods of aspects 1-13.

Aspect 24: A base station (BS) comprising means for performing the methods of aspects 14-20.

Aspect 25: A non-transitory computer-readable medium (CRM) having program code recorded thereon, the program code comprises code for causing a UE to perform the methods of aspects 1-13.

Aspect 26: A non-transitory computer-readable medium (CRM) having program code recorded thereon, the program code comprises code for causing a BS to perform the methods of aspects 14-20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), the method comprising:
    receiving, from a base station (BS), a downlink control information (DCI) configured to be secured with one or more secret keys;
    generating the one or more secret keys;
    assigning a value for a field in the DCI using the one or more secret keys; and
    communicating with the BS based on the value of the field in the DCI.

2. The method of claim 1, further comprising:
    estimating a radio channel configured to connect the UE to the BS using a radio resource of the radio channel, a secret key of the one or more secret keys generated based on the estimating the radio channel.

3. The method of claim 2, wherein the radio resource is a resource element (RE), a resource block (RB), a component carrier (CC), or a combination thereof, of a radio frame of the radio channel.

4. The method of claim 2, further comprising receiving, from the BS, a radio resource control (RRC) message or a medium access control-control element (MAC-CE) message configuring the UE with the radio resource to be used for the estimating the radio channel.

5. The method of claim 1, wherein a secret key of the one or more secret keys is a symmetric key shared between the BS and the UE.

6. The method of claim 1, further comprising:
    receiving, from the BS, a radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the UE to the BS.

7. The method of claim 6, further comprising selecting a BWP set from the one or more BWP sets using a first secret key, or a first part thereof, of the one or more secret keys.

8. The method of claim 7, further comprising:
    selecting a BWP indicator of the one or more BWP indicators of the selected BWP set using the first secret key, or a second part thereof, wherein:
        the assigning includes assigning the selected BWP indicator as the value for the field in the DCI; and
        the communicating includes communicating with the BS using the BWP of the radio frame of the radio channel identified by the assigned BWP indicator.

9. The method of claim 8, further comprising decrypting the selected BWP indicator using the first secret key, or a third part thereof, prior to assigning the selected BWP indicator as the value for the field in the DCI.

10. The method of claim 1, wherein:
    the field is a frequency allocation field, and the value is an encrypted frequency domain resource allocation (FDRA) indication encrypted using a first secret key of the one or more secret keys, the method further comprising:
        selecting, using a second secret key of the one or more secret keys, a BWP of a radio frame of a radio channel configured to connect the UE to the BS; and
        decrypting, using the first secret key, the encrypted FDRA indication in the DCI, wherein:
            the assigning includes assigning the decrypted FDRA indication as the value for the field in the DCI; and
            the communicating includes communicating with the BS using a resource block of the BWP corresponding to the assigned decrypted FDRA indication.

11. The method of claim 1, wherein:
    the field is a time domain resource allocation (TDRA) field, and the value is an encrypted TDRA indication encrypted using a first secret key of the one or more secret keys, the method further comprising:
        selecting, using a second secret key of the one or more secret keys, a BWP of a radio frame of a radio channel configured to connect the UE to the BS; and
        decrypting, using the first secret key, the encrypted TDRA indication in the DCI, wherein:
            the assigning includes assigning the decrypted TDRA indication as the value for the field in the DCI; and
            the communicating includes communicating with the BS using a TDRA configuration of the BWP corresponding to the assigned decrypted TDRA indication.

12. The method of claim 11, further comprising:
    receiving, from the BS, a radio resource control (RRC) message including an encrypted TDRA configuration;

and decrypting, using a third secret key of the one or more secret keys, the encrypted TDRA configuration to generate the TDRA configuration of the BWP used for the communication with the BS.

13. The method of claim 1, wherein the DCI is configured to be encrypted with a secret key of the one or more secret keys.

14. A method of wireless communication performed by a base station (BS), the method comprising:
    generating one or more secret keys;
    securing a downlink control information (DCI) using the one or more secret keys, the securing the DCI including encrypting a value of a field in the DCI using a first secret key of the one or more secret keys; and
    transmitting the secured DCI to a user equipment (UE) to facilitate communication between the UE and the BS.

15. The method of claim 14, further comprising:
    estimating a radio channel configured to connect the BS to the UE using a radio resource of the radio channel, a secret key of the one or more secret keys generated based on the estimating the radio channel.

16. The method of claim 15, wherein the radio resource is a resource element (RE), a resource block (RB), a component carrier (CC), or a combination thereof, of a radio frame of the radio channel.

17. The method of claim 15, further comprising:
    transmitting, to the UE, a radio resource control (RRC) message or a medium access control-control element (MAC-CE) message to configure the UE with the radio resource to be used for the estimating the radio channel.

18. The method of claim 14, wherein a secret key of the one or more secret keys is a symmetric key shared between the BS and the UE.

19. The method of claim 14, further comprising:
    transmitting, to the UE, a radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the BS to the UE.

20. The method of claim 14, wherein the secured DCI is encrypted with a secret key of the one or more secret keys.

21. A user equipment (UE), comprising:
    a memory;
    at least one processor operatively coupled to the memory; and
    a transceiver operatively coupled to the at least one processor, wherein:
        the transceiver is configured to receive, from a base station (BS), a downlink control information (DCI) configured to be secured with one or more secret keys;
        the at least one processor is configured to:
            generate the one or more secret keys; and
            determine a value for a field in the DCI using the one or more secret keys; and
        the transceiver is further configured to communicate with the BS based on the value of the field in the DCI.

22. The UE of claim 21, wherein the at least one processor is further configured to:
    estimate a radio channel configured to connect the UE to the BS using a radio resource of the radio channel, a secret key of the one or more secret keys generated based on the estimating the radio channel.

23. The UE of claim 21, wherein a secret key of the one or more secret keys is a symmetric key shared between the BS and the UE.

24. The UE of claim 21, wherein the transceiver is further configured to:
    receive, from the BS, a radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the UE to the BS.

25. The UE of claim 21, wherein:
    the field is a frequency allocation field, and the value is an encrypted frequency domain resource allocation (FDRA) indication encrypted using a first secret key of the one or more secret keys, the at least one processor further configured to:
        select, using a second secret key of the one or more secret keys, a BWP of a radio frame of a radio channel configured to connect the UE to the BS;
        decrypt, using the first secret key, the encrypted FDRA indication in the DCI;
        assign the decrypted FDRA indication as the value for the field in the DCI; and
        communicate with the BS using a resource block of the BWP corresponding to the assigned decrypted FDRA indication.

26. The UE of claim 21, wherein:
    the field is a time domain resource allocation (TDRA) field, and the value is an encrypted TDRA indication encrypted using a first secret key of the one or more secret keys, the at least one processor further configured to:
        select, using a second secret key of the one or more secret keys, a BWP of a radio frame of a radio channel configured to connect the UE to the BS;
        decrypt, using the first secret key, the encrypted TDRA indication in the DCI;
        assign the decrypted TDRA indication as the value for the field in the DCI; and
        communicate with the BS using a TDRA configuration of the BWP corresponding to the assigned decrypted TDRA indication.

27. A base station (BS), comprising:
    a memory;
    at least one processor operatively coupled to the memory; and
    a transceiver operatively coupled to the at least one processor, wherein:
        the at least one processor is configured to:
            generate one or more secret keys; and
            secure a downlink control information (DCI) using the one or more secret keys, the securing the DCI including encrypting a value of a field in the DCI using a first secret key of the one or more secret keys; and
        the transceiver is configured to:
            transmit the secured DCI to a user equipment (UE) to facilitate communication between the UE and the BS.

28. The BS of claim 27, wherein the at least one processor further configured to:
    estimate a radio channel configured to connect the BS to the UE using a radio resource of the radio channel, a secret key of the one or more secret keys generated based on the estimating the radio channel.

29. The BS of claim 27, wherein a secret key of the one or more secret keys is a symmetric key shared between the BS and the UE.

30. The BS of claim 27, wherein the transceiver is configured to:

transmit, to the UE, a radio resource control (RRC) message or a medium access control-control element (MAC-CE) message to configure the UE with one or more bandwidth part (BWP) sets, each BWP set including one or more BWP indicators each identifying a BWP of a radio frame of a radio channel configured to connect the BS to the UE.

\* \* \* \* \*